United States Patent
Kawasue

(10) Patent No.: US 12,380,580 B2
(45) Date of Patent: Aug. 5, 2025

(54) WEIGHT ESTIMATION DEVICE AND PROGRAM

(71) Applicant: UNIVERSITY OF MIYAZAKI, Miyazaki (JP)

(72) Inventor: Kikuhito Kawasue, Miyazaki (JP)

(73) Assignee: UNIVERSITY OF MIYAZAKI, Miyazaki (JP)

(*) Notice: Subject to any disclaimer, the term of this patent is extended or adjusted under 35 U.S.C. 154(b) by 333 days.

(21) Appl. No.: 17/904,371

(22) PCT Filed: Feb. 16, 2021

(86) PCT No.: PCT/JP2021/005666
§ 371 (c)(1),
(2) Date: Aug. 16, 2022

(87) PCT Pub. No.: WO2021/166894
PCT Pub. Date: Aug. 26, 2021

(65) Prior Publication Data
US 2023/0154023 A1 May 18, 2023

(30) Foreign Application Priority Data
Feb. 18, 2020 (JP) .................................. 2020-025139

(51) Int. Cl.
*G06T 7/521* (2017.01)
*G01B 11/22* (2006.01)
(Continued)

(52) U.S. Cl.
CPC .............. *G06T 7/521* (2017.01); *G01B 11/22* (2013.01); *G01S 17/89* (2013.01); *H04N 7/183* (2013.01); *G06T 2207/10028* (2013.01)

(58) Field of Classification Search
CPC .......... G06T 7/521; G06T 2207/10028; G01B 11/22; G01B 11/24; G01S 17/89; H04N 7/183; G01F 17/00; G01G 17/08
(Continued)

(56) References Cited

U.S. PATENT DOCUMENTS 5,412,420 A 5/1995 Ellis
8,369,566 B2 2/2013 Sinzinger et al.
(Continued)

FOREIGN PATENT DOCUMENTS

CN 102405394 A 4/2012
JP H10-500207 A 1/1998
(Continued)

OTHER PUBLICATIONS

CNIPA, Chinese Office Action issued on Jul. 4, 2023 for Chinese Patent Application No. 202180013781.6, 9 pages.
(Continued)

*Primary Examiner* — Stephen P Coleman
(74) *Attorney, Agent, or Firm* — MASUVALLEY & PARTNERS; Peter Martinez

(57) ABSTRACT

In a configuration in which an image acquisition unit that acquires an image of an animal, a shape identification unit that identifies a shape of a predetermined portion of the animal from the image, an information generation unit that, on a basis of the shape of the predetermined portion, generates estimation information used for estimating a weight of the animal, and a weight estimation unit that estimates the weight on a basis of the estimation information are provided, the information generation unit is capable of generating the estimation information both in a case where a first image (an animal image GA) in which the animal is imaged from a first direction is acquired and in a case where
(Continued)

a second image in which the animal is imaged from a second direction that is different from the first direction is acquired.

6 Claims, 8 Drawing Sheets

(51) Int. Cl.
  *G01S 17/89* (2020.01)
  *H04N 7/18* (2006.01)
(58) Field of Classification Search
  USPC .................................................. 382/110
  See application file for complete search history.

(56) References Cited

U.S. PATENT DOCUMENTS

2010/0222684 A1    9/2010  Hatzilias et al.
2010/0289879 A1*  11/2010  Sinzinger ............... A01K 29/00
                                                      348/46
2014/0286540 A1    9/2014  Hatzilias et al.
2019/0104231 A1*   4/2019  Sano ......................... H04N 5/76
2019/0186981 A1    6/2019  Sugaya

FOREIGN PATENT DOCUMENTS

JP     2014-44078 A     3/2014
JP     2019-45478 A     3/2019
JP     6559197 B2       7/2019
JP     6637169 B2      12/2019
WO    2010098954 A2     9/2010

OTHER PUBLICATIONS

ISA/JPO, International Search Report mailed on Mar. 21, 2021 in International Application No. PCT/JP2021/005666 with English Translation and Written Opinion, 8 pages.
European Patent Office, Supplementary European Search Report dated May 5, 2024 in European Patent Application No. 21757749.3, 8 pages.
Japan Patent Office, Japanese Office Action mailed on Oct. 25, 2022 in Japanese patent application No. 2022-501900, 3 pages.

* cited by examiner (a)

(b)

(c)

(a)

(b)

(c)

(d)

(a)

(b)

(c)

| GW | GM |
|---|---|
| Gw1 | Gm1 |
| Gw2 | Gm2 |
| Gw3 | Gm3 |
| Gw4 | Gm4 |
| Gw5 | Gm5 |
| Gw6 | Gm6 |
| Gw7 | Gm7 |

(d-1)

(d-2)

(d-3)

WEIGHT ESTIMATION DEVICE AND PROGRAM

RELATED APPLICATIONS

This application is the U.S. National Phase of and claims priority to International Patent Application No. PCT/JP2021/005666, International Filing Date Feb. 16, 2021; which claims benefit of Japanese Patent Application No. 2020-025139 filed Feb. 18, 2020; both of which are incorporated herein by reference in their entireties.

FIELD

The present invention relates to a weight estimation device and a program.

BACKGROUND

Conventionally, the weight of an animal such as a livestock animal is measured with a weight scale. However, there is a problem that, when the animal is not still on the weight scale, its weight cannot be measured accurately. As a configuration to solve this problem, Patent Literature 1 describes a configuration in which an animal is imaged from a predetermined imaging direction to measure (estimate) the weight of the animal on the basis of the captured image. With this configuration, it is not necessary to make the animal still on a weight scale, so that the above problem is avoided.

CITATION LIST

Patent Literature

Patent Literature 1: Japanese Patent Application Laid-open No. 2014-44078

SUMMARY

Technical Problem

However, in the configuration of Patent Literature 1, there is a problem that the freedom degree of the imaging direction enabling to estimate the weight of an animal is low. Specifically, in the configuration of Patent Literature 1, the weight of the animal can be estimated only when the animal is imaged from a first direction (a vertical direction), and the weight of the animal cannot be estimated when the animal is imaged from a second direction that is different from the first direction. In consideration of such circumstances, an object of the present invention is to improve the freedom degree of the imaging direction enabling to estimate the weight of an animal.

Solution to Problem

In order to solve the above problem, a weight estimation device according to the present invention includes an image acquisition unit that acquires an image of an animal, a shape identification unit that identifies a shape of a predetermined portion of the animal from the image, an information generation unit that, on a basis of the shape of the predetermined portion, generates estimation information used for estimating a weight of the animal, and a weight estimation unit that estimates the weight on a basis of the estimation information, wherein the information generation unit is capable of generating the estimation information in a case where a first image in which the animal is imaged from a first direction is acquired and is capable of generating the estimation information also in a case where a second image in which the animal is imaged from a second direction that is different from the first direction is acquired.

According to the above configuration, the weight of the animal can be estimated in a case where a first image in which the animal is imaged from a first direction is acquired and the weight of the animal can be estimated also in a case where a second image in which the animal is imaged from a second direction that is different from the first direction is acquired. Therefore, as compared to the configuration of Patent Literature 1, the freedom degree of an imaging direction enabling to estimate the weight of an animal is improved.

Advantageous Effects of Invention

According to the present invention, the freedom degree of an imaging direction enabling to estimate the weight of an animal is improved.

DESCRIPTION OF EMBODIMENTS

First Embodiment

Figure 1:
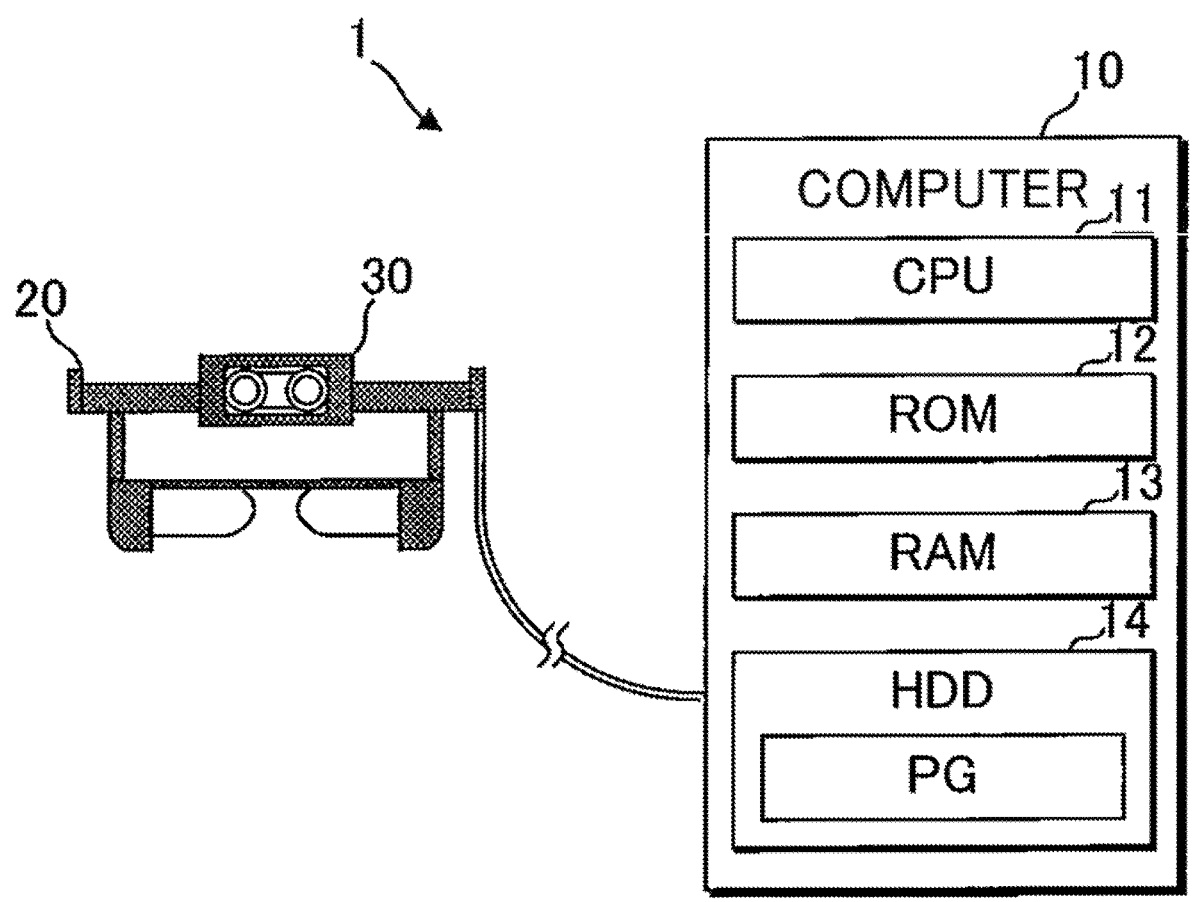
FIG. 1 is a hardware configuration diagram of a weight estimation device.

FIG. 1 is a hardware configuration diagram of a weight estimation device 1. As illustrated in FIG. 1, the weight estimation device 1 includes a computer 10, a head mounted display 20, and a depth camera 30. These constituent elements are communicably connected to one another.

The computer 10 is configured to include a CPU (Central Processing Unit) 11, a ROM (Read Only Memory) 12, a RAM (Random access memory) 13, and an HDD (Hard Disk Drive) 14. A portable computer (for example, a laptop personal computer) is employed as the computer 10 according to the present embodiment. Note that a desktop personal computer may be employed as the computer 10.

The HDD 14 in the computer 10 stores therein various types of data including a weight estimation program PG. The CPU 11 realizes various types of functions described later (such as a weight estimation unit 108) by executing the weight estimation program PG. The RAM 13 temporarily stores therein, for example, various types of information that is referred to when the CPU 11 executes a program. Further, the ROM 12 stores therein various types of information in a nonvolatile manner. It is also possible to have a configuration in which the weight estimation program PG is stored in a device other than the HDD 14.

The head mounted display 20 can be fixed on the head of a user, and a publicly known head mounted display may be appropriately employed as the head mounted display 20. For example, a display including a small liquid-crystal display and a half-mirror may be employed as the head mounted display 20. The small liquid-crystal display described above can display various types of images and an image displayed on the small liquid-crystal display is reflected on the half-mirror and is visibly recognized by a user. In the configuration described above, when a user sees a view through the half-mirror, an image displayed on the small liquid-crystal display is visibly recognized as it is overlapped on the view. Note that the type of the head mounted display 20 is not limited to the above example.

The depth camera 30 generates a distance image (a three-dimensional image) including depth information indicating a distance to a subject. For example, as the distance image, a point cloud image captured with a LIDAR (Light Detection and Ranging, Laser Imaging Detection and Ranging) technology is assumed. Further, a tilt sensor is provided in the depth camera 30. The tilt sensor detects the magnitude of tilt in the imaging direction with respect to a vertical direction.

As illustrated in FIG. 1, the depth camera 30 is fixed on the head mounted display 20. Therefore, when a user wears the head mounted display 20 on his head, the depth camera 30 is fixed at a specific position as viewed from the user. Specifically, the depth camera 30 is fixed at a position where the imaging direction substantially matches the line-of-sight direction of the user.

With the above configuration, the view visibly recognized by a user is imaged by the depth camera 30. Therefore, as the user moves the line-of-sight direction (the direction of his face) so that an animal is positioned within the user's sight, the animal can be imaged. Note that it is also possible to employ a configuration that the user holds the depth camera 30 in his hand to capture images of an animal. However, with this configuration, the user cannot use his hands freely. In contrast, the configuration of the present embodiment has an advantage that the user can use his hands freely.

The image captured by the depth camera 30 is displayed on the head mounted display 20 (a small liquid-crystal display). Specifically, the image captured by the depth camera 30 is displayed on the head mounted display 20 on a real-time basis. With this configuration, the user can check the image captured by the depth camera 30 on a real-time basis. Note that it is also possible to employ a configuration in which the image captured by the depth camera 30 is not displayed on a real-time basis.

The images of an animal captured by the depth camera 30 are input to the computer 10. The computer 10 estimates the weight (for example, the weight of carcasses) of an animal on the basis of the input images by executing the weight estimation program PG. This function is described below in detail.

Figure 2:
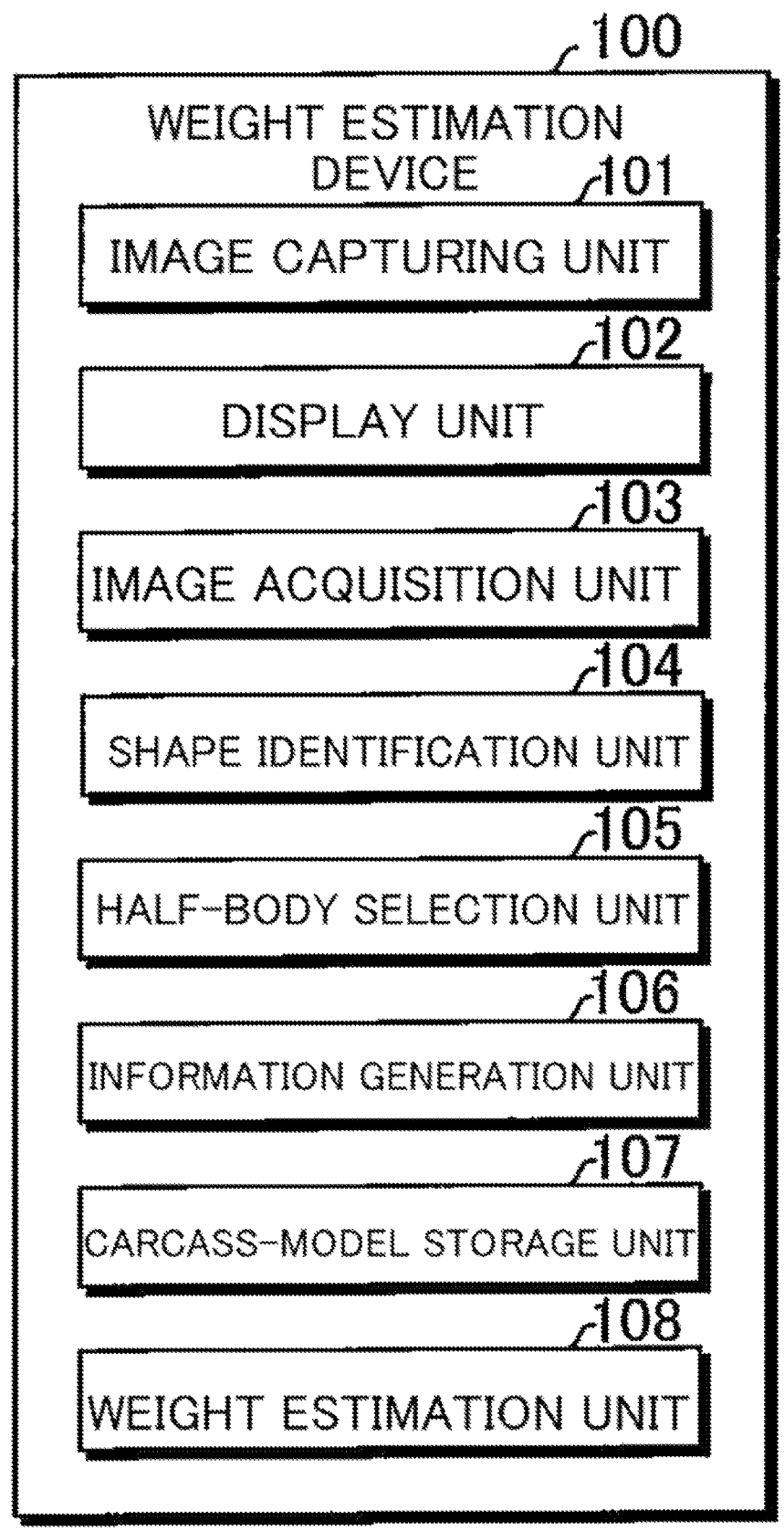
FIG. 2 is a functional block diagram of the weight estimation device.

FIG. 2 is a functional block diagram of a weight estimation device 100. The weight estimation device 100 is configured to include an image capturing unit 101, a display unit 102, an image acquisition unit 103, a shape identification unit 104, a half-body selection unit 105, an information generation unit 106, a carcass-model storage unit 107, and the weight estimation unit 108. Each of the above functions is realized as the CPU 11 executes the weight estimation program PG.

The image capturing unit 101 can capture images of an animal. Specifically, the image capturing unit 101 is fixed at a specific position as viewed from a user and can image an animal that is positioned in the line-of-sight direction of the user. For example, the depth camera 30 functions as the image capturing unit 101. The display unit 102 can display various types of images including images captured by the image capturing unit 101 (see FIG. 7(*a*) described later). For example, the head mounted display 20 functions as the display unit 102.

Figure 3:
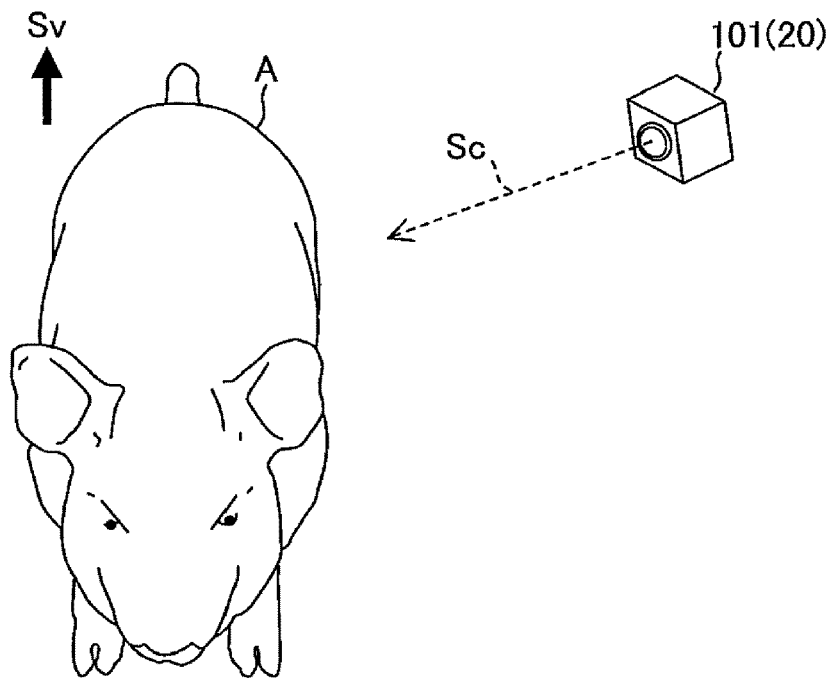
FIG. 3 are explanatory diagrams of an animal image.
Figure 3:
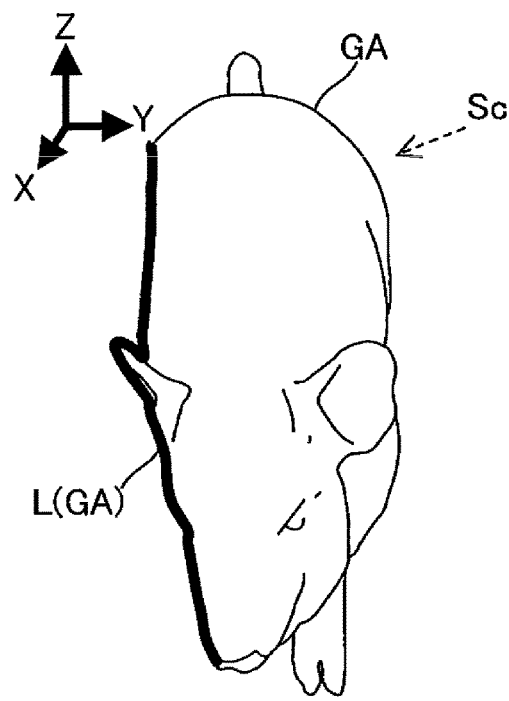
Figure 3:
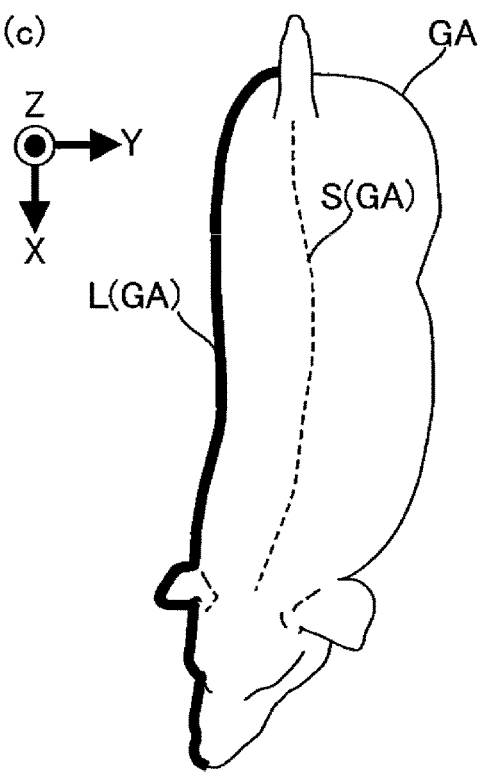

The image acquisition unit 103 acquires images of an animal (see FIG. 3(*b*) described later). Specifically, the images captured by the image capturing unit 101 include images such as background images in addition to images of an animal. The image acquisition unit 103 excerpts and acquires images showing one animal from the images captured by the image capturing unit 101. The images of an animal acquired by the image acquisition unit 103 are used to estimate the weight of the animal.

The image acquisition unit 103 according to the present embodiment acquires an image of an animal from the images captured by the image capturing unit 101 with a region growing method. Specifically, in the images captured by the image capturing unit 101, the image acquisition unit 103 identifies one pixel as a seed pixel. From each of images (objects) included in the images captured by the image capturing unit 101, the image acquisition unit 103 acquires an image having a seed pixel contained in each of the pixels constituting the image itself. In this configuration, by identifying any one of pixels constituting an image of an animal as a seed pixel, the image of the animal is excerpted and acquired from the images captured by the image capturing unit 101.

More specifically, upon identification of a seed pixel, the image acquisition unit 103 attaches a predetermined label on the seed pixel. The image acquisition unit 103 attaches a common label on pixels among neighboring pixels of the seed pixel satisfying predetermined conditions. Further, neighboring pixels of the pixels having a common label attached thereon are also attached with the label when these neighboring pixels satisfy the predetermined conditions. This process is repeated until all the pixels falling under the predetermined conditions are attached with a label. The image acquisition unit 103 acquires an image constituted of the pixels attached with a common label as an image of an animal. An identifying method of the seed pixel is explained in detail with reference to FIG. 7(*a*) to FIG. 7(*c*) described later.

In the following descriptions, for the sake of explanation, there is a case where an image of an animal acquired by the image acquisition unit 103 is described as "animal image". Further, there is a case where the magnitude of tilt in an imaging direction with respect to a vertical direction detected by the tilt sensor explained above is described as "tilt information". The weight estimation device 100 stores therein tilt information at the time of imaging an animal image in association with the animal image. This tilt information is used when the orientation of the animal image is adjusted (corrected).

The shape identification unit 104 identifies the shape of a predetermined portion of an animal from an animal image. The shape identification unit 104 according to the present embodiment identifies the shape of the spine of the animal as a predetermined portion. In the following descriptions, the shape of the spine of an animal is simply referred to as "spine curve". A specific example of the identification method of a spine curve is explained with reference to FIG. 4(a) and FIG. 4(b) described later.

The half-body selection unit 105 selects, as a specified half body, either one of the right side of the body and the left side of the body, respectively positioned on the right side and the left side of the spine as viewed from the animal. While the details thereof are described later, depending on the imaging direction, there is a case where the whole body of the animal is not imaged. In such a case, an animal image showing an animal with a part of its body missing is generated (see FIG. 3(b)). For example, when an animal is imaged from the right side of the body, an animal image showing an animal with a part (or the whole) of the left side of the body missing. The half-body selection unit 105 selects, from the half bodies of the animal, a half body imaged with a larger area than the other half as a specified half body.

The information generation unit 106 generates estimation information used for estimating the weight of an animal on the basis of a spine curve (the shape of a predetermined portion). A whole image GW illustrated in FIG. 5(d) described later is included in the estimation information in the present embodiment. The whole image GW is an image showing the whole body of an animal and it is generated (estimated) from an animal image (an image with a part of the animal missing) acquired by the image acquisition unit 103. Specifically, an image showing the specified half body described above (a half body image described later. See FIG. 5(c)) is generated from the animal image, and the whole image GW is generated from an image showing the specified half body.

The carcass-model storage unit 107 stores therein a carcass model image GM (see FIG. 6(a) described later). Similarly to the whole image GW, the carcass model image GM is an image showing the whole body of an animal. Note that the carcass model image GM is an image of an animal from which portions (internal organs and the like) not regarded as carcasses are eliminated. The carcass model image GM is obtained by, for example, performing CT (Computed Tomography) scanning on an animal having a standard body shape.

The weight estimation unit 108 estimates the weight of the animal on the basis of the whole image GW (estimation information) of the animal. Specifically, a mean density ($kg/m^3$) of carcasses of the animal is stored in the weight estimation device 100 in advance. The mean density of carcasses stored in the weight estimation device 100 may be determined on the basis of, for example, each measurement value obtained from each of experiments repeatedly performed to actually measure a mean density of carcasses of an animal. For example, the mean value of measurement values of respective experiments is determined to be the mean density.

Further, the carcass model image GM is fitted (magnified or reduced) so as to match the outer edge of the whole image GW with the outer edge of the carcass model image GM. The weight estimation unit 108 estimates the product of the volume of the fitted carcass model image GM and the mean density of carcasses of the animal as the weight of the animal.

As described above, in the present embodiment, a configuration in which "the weight of carcasses of an animal" is estimated as "the weight of an animal" is employed. However, it is also possible to employ a configuration in which a weight other than "the weight of carcasses of an animal" is estimated as "the weight of an animal". For example, a configuration in which "the weight of an animal including its internal organs and the like" (live weight) is estimated as "the weight of an animal" is conceivable.

Specifically, there has been known that the live weight of an animal (for example, a swine) is obtained by a weight formula (for example, see Japanese Patent Application Laid-open No. 2019-45478). The weight formula represents a relation among a live weight, a body length, and a chest circumference and it is obtained experimentally. Further, the body length and the chest circumference of the animal are identified from the whole image GW. Therefore, on the basis of the body length and the chest circumference identified from the whole image GW, the weight estimation unit 108 can calculate (estimate) the live weight of the animal using the weight formula. It is also possible to employ a configuration in which both the live weight and the weight of carcasses of the animal are estimated.

Figure 4:
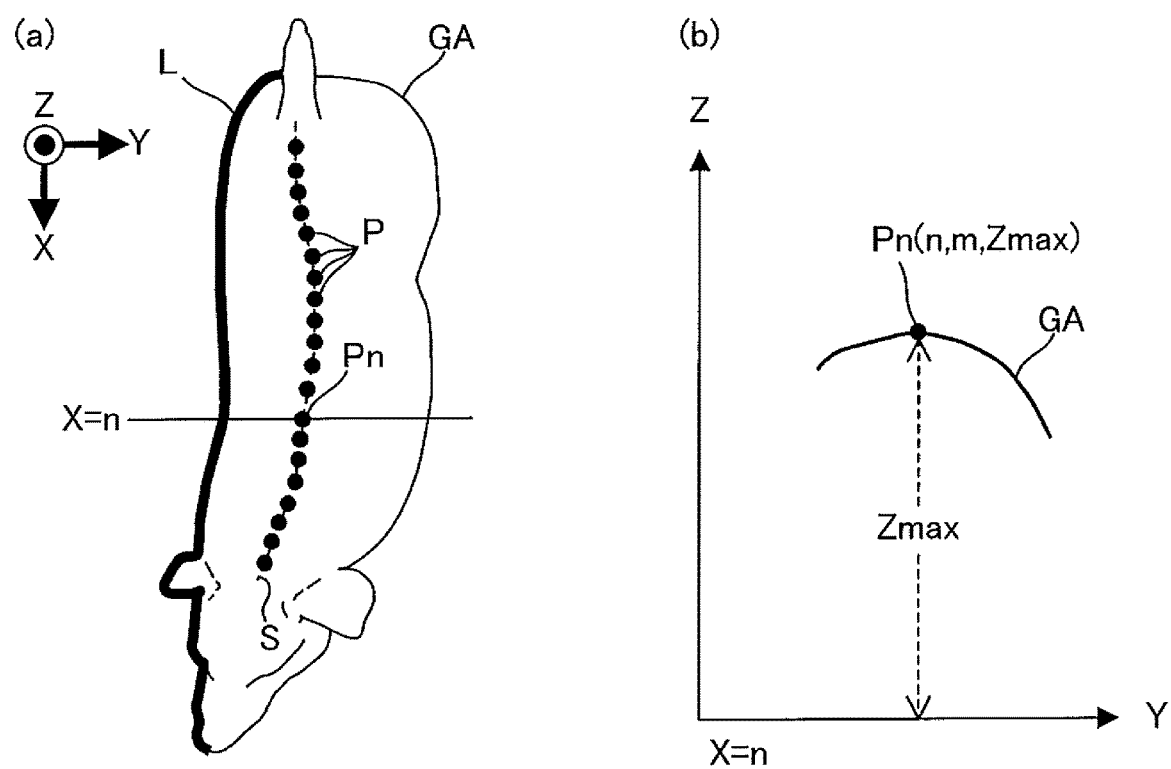
FIG. 4 are explanatory diagrams of a configuration to identify a spine curve.

In the following descriptions, specific examples of operations of the weight estimation device 100 are explained with reference to FIGS. 3(a to c), FIGS. 4 (a and b), FIGS. 5(a to d), FIGS. 6(a to c, d1 to d-3), and FIGS. 7(a to c). In the specific examples explained below, an example of "swine" is explained as an animal A the weight of which is to be estimated; however, the animal the weight of which is to be estimated is not limited to "swine". For example, it is also possible to employ a configuration to estimate the weight of an animal such as "cow" or "dolphin".

FIG. 3(a) is an explanatory diagram of a specific example of an imaging direction Sc. In FIG. 3(a), a vertical direction Sv is indicated with an arrow. The imaging direction Sc in the specific example in FIG. 3(a) is a direction intersecting with the vertical direction Sv. Specifically, there is assumed a specific example where the animal A is imaged by the image capturing unit 101 (the depth camera 30) from the upper-left direction as viewed from the animal A.

FIG. 3(b) is an explanatory diagram of a specific example of an animal image GA. As illustrated in FIG. 3(b), the animal image GA is a three-dimensional image displayed in an XYZ space. The animal image GA is obtained by performing a curved-surface approximating process for multiple times with respect to the image captured by the image capturing unit 101.

The animal image GA is rotated to match a vertical direction in a real space with a Z-axis direction in the XYZ space on the basis of tilt information at the time point of capturing the image of the animal A. Further, the animal image GA is rotated so as to match the longitudinal direction with a Y-axis direction. Specifically, the animal image GA is rotated so that the head of the animal heads in a positive direction of the Y-axis. The animal image GA is a point cloud image (point cloud data). Therefore, for example, using a principal component analysis, the direction of the head of the animal in the animal image GA can be identified. As a configuration to adjust the direction of the animal image GA, for example, a configuration described in Japanese Patent Application Laid-open No. 2014-44078 may be employed.

Meanwhile, depending on the imaging direction, there is a case where the whole body of the animal is not imaged. In such a case, the animal image GA shows an animal with a part of its body missing. For example, in the specific example in FIG. 3(b), an animal image GA in a case where the animal A is imaged from the upper-left direction as viewed from the animal A (similarly to the specific example in FIG. 3(a)) is assumed. The animal image GA shows an animal with a lower side of its right side of the body missing. Specifically, as illustrated in FIG. 3(b), the animal image GA shows an animal with a deeper side with respect to a boundary part L as viewed from the imaging direction Sc missing.

However, the carcass model image GM is an image showing the whole body (except for internal organs) of an animal (see FIG. 6(a) described later). There is assumed a configuration in which the weight of carcasses is estimated by matching the outer edge of the carcass model image GM with the outer edge of an animal image GA (hereinafter, "comparative example X"). In this comparative example X, when a body part of the animal shown in the animal image GA is missing, the outer edges of the respective images do not match each other accurately, so that there occurs an inconvenience that the weight of carcasses cannot be estimated with high accuracy.

In consideration of the above circumstances, the weight estimation device 100 according to the present embodiment employs a configuration in which the whole image GW can be generated (estimated) from the animal image GA. The whole image GW shows the whole body of an animal. Therefore, by matching the outer edge of the whole image GW with the outer edge of the carcass model image GM to estimate the weight of carcasses, the inconvenience described above is avoided as compared to the comparative example X. This configuration is described below in detail.

FIG. 4(a) and FIG. 4(b) are explanatory diagrams of a configuration (the shape identification unit 104) to identify a spine curve S. Similarly to FIG. 3(c), FIG. 4(a) assumes a case where the animal image GA is viewed from the Z-axis direction. Further, in FIG. 4(a), a plurality of peaks P (including Pn) constituting the spine curve S are illustrated. The spine curve S is substantially identified by identifying the coordinate of each peak P.

FIG. 4(b) illustrates a cross section of the animal image GA in parallel to the Y-axis and the Z-axis (in parallel to a Y-Z plane). Specifically, the cross section illustrated in FIG. 4(b) assumes a case where the animal image GA is cut at a position where the X-coordinate is at a numeral "n" (see also FIG. 4(a)). In FIG. 4(b), among all the portions of an animal, a part (an outer edge) of an animal image GA showing the surface of the back of the animal is illustrated in an excerpted manner.

Each of the peaks P constituting the spine curve S of an animal normally takes its highest point (a peak of a cross section) on the Z-coordinate in a cross section in parallel to the Y-Z plane of the animal image GA. Therefore, the weight estimation device 100 identifies the peaks of the cross section of the animal image GA as the peaks P constituting the spine curve S.

For example, in the specific example in FIG. 4(b), there is assumed a case where the coordinates of the peak of a cross section in parallel to the Y-Z plane where the X-coordinate is at a numeral "n" are (n, m, Zmax). In this case, the coordinates (n, m, Zmax) are identified as the coordinates of the peak P. Further, as for other positions on an X-axis (positions other than X=n), the weight estimation device 100 also identifies the peak of the cross section in parallel to the Y-Z plane as the peak P. With this configuration, the spine curve S is identified.

FIG. 5(a) to FIG. 5(d) are explanatory diagrams of a configuration (the information generation unit 106) to generate the whole image GW (estimation information) on the basis of the spine curve S. Similarly to FIG. 3(c) and FIG. 4(a), FIG. 5(a) to FIG. 5(d) assume a case where the animal image GA is viewed from the Z-axis direction.

FIG. 5(a) is an explanatory diagram of a specific example of the animal image GA used for generating the whole image GW. The weight estimation device 100 performs a straightening process, a cutting process, a selecting process, and a generating process on the animal image GA to generate the whole image GW.

In the following descriptions, for the sake of explanation, a planar image that is vertical to the X-Y plane and vertical to the spine curve S projected onto the X-Y plane is described as "cross-sectional image Gc". The animal image GA is segmented into, for example, multiple cross-sectional images Gc, the number of which is substantially the same as the number of peaks P. Note that in FIG. 5(a), among these cross-sectional images Gc, a cross-sectional image Gc1 to a cross-sectional image Gc4 are illustrated in an excerpted manner.

As illustrated in FIG. 5(a), the cross-sectional image Gc1 is an image including a peak P1 on the spine curve S. Further, the cross-sectional image Gc2 is an image including a peak P2 on the spine curve S, the cross-sectional image Gc3 is an image including a peak P3 on the spine curve S, and the cross-sectional image Gc4 is an image including a peak P4 on the spine curve S.

In the specific example in FIG. 5(a), a case where the spine curve S in the animal image GA is not straight as viewed from the Z-axis direction is assumed. As is understood from FIG. 5(a), each of the cross-sectional images Gc constituting the animal image GA includes a cross-sectional image Gc that is not parallel to the Y-Z plane. The weight estimation device 100 according to the present embodiment performs a straightening process on the animal image GA described above.

FIG. 5(b) is an explanatory diagram of a specific example of the animal image GA having a straightening process performed thereon. In the specific example in FIG. 5(b), a case where a straightening process has been performed on the animal image GA in FIG. 5(a) is assumed. In the straightening process, the position and the orientation of each of the cross-sectional images Gc are adjusted so as to make the orientations of all the cross-sectional images Gc of the animal image GA parallel to the Y-Z plane and make the spine curve S as viewed from the Z-axis direction parallel to the Y-axis direction. In the straightening process, it suffices that the spine curve S as viewed from the Z-axis direction is adjusted to be in parallel to the Y-axis direction, and specific details of the straightening process are not limited to the example described above.

The weight estimation device 100 (the half-body selection unit 105) performs a selecting process after performing the straightening process described above. In the selecting process, either one of the right side of the body and the left side of the body of the animal A is selected as a specified half body. Specifically, there is assumed a case where the animal image GA is cut into two images (an image showing the right side of the body and an image showing the left side of the body) with respect to the spine curve S in the Z-axis direction. In the selecting process, from these two images, one of the half bodies shown in a larger image than the other one is selected as a specified half body.

For example, a case where the selecting process is performed on the animal image GA illustrated in FIG. 5(b) is assumed. In the animal image GA, substantially the whole of the left side of the body of the animal A is shown. Meanwhile, as illustrated in FIG. 5(b), in the right side of the body of the animal A, a portion on the right side with respect to the boundary part L as viewed from the animal A is not shown (is missing) in the animal image GA. When the selecting process is performed on the animal image GA, the left side of the body is selected as a specified half body. The weight estimation device 100 performs a cutting process on the animal image GA after performing the selecting process.

Figure 5:
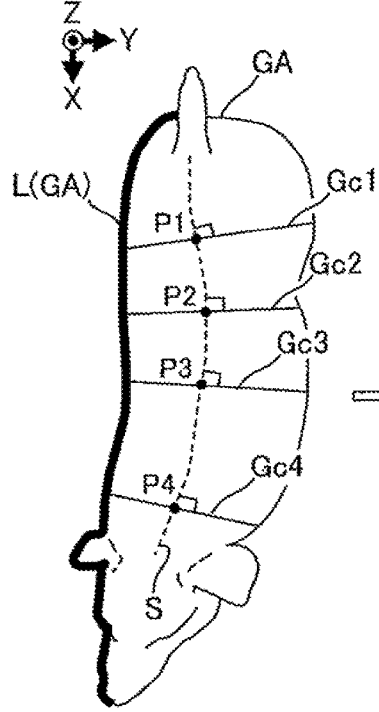
FIG. 5 are explanatory diagrams of a configuration to generate a whole image.
Figure 5:
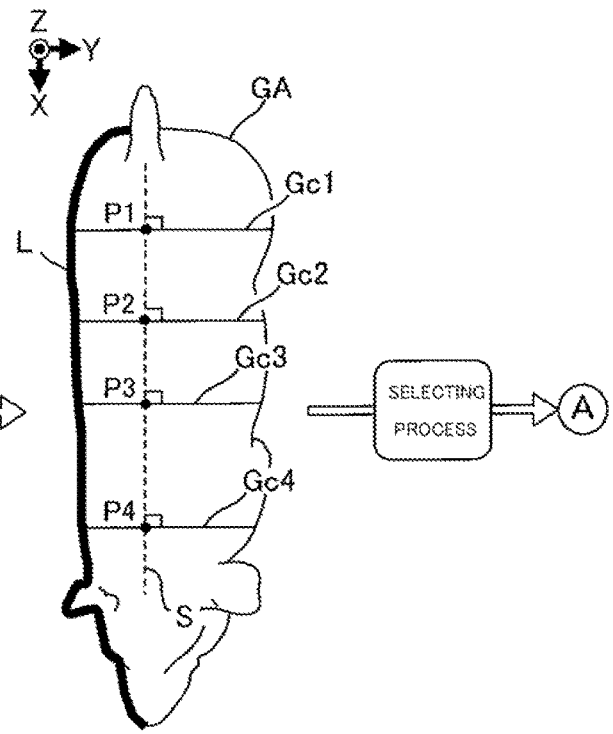
Figure 5:
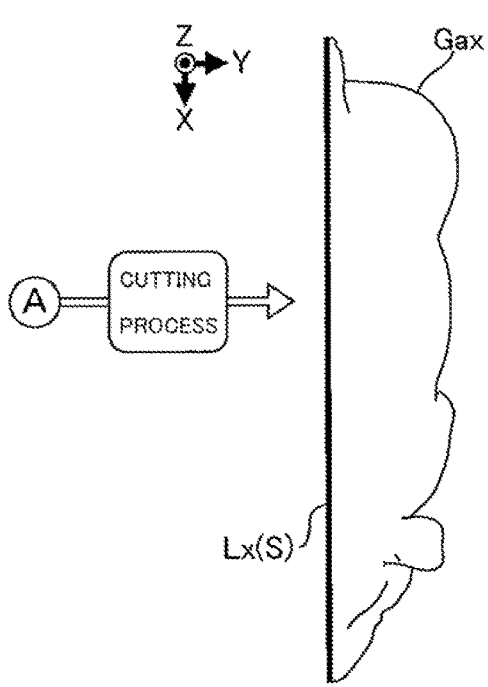
Figure 5:
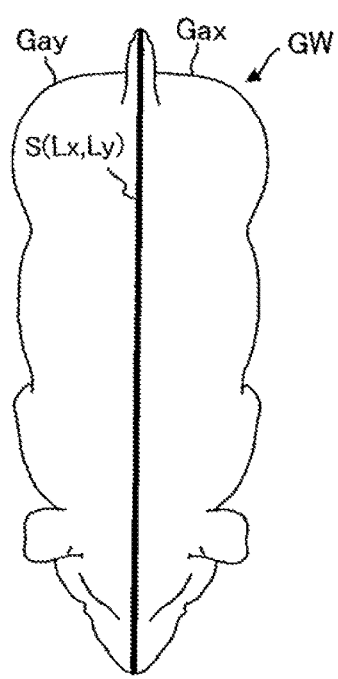

FIG. 5(*c*) is an explanatory diagram of a specific example of the animal image GA having the cutting process performed thereon. In the cutting process, among the half bodies of the animal A, a portion representing the half body not selected as the specified half body described above is cut from the animal image GA. In the following descriptions, in order to distinguish the animal image GA having the cutting process performed thereon from the animal image GA before the cutting process is performed thereon, there is a case where the animal image GA having the cutting process performed thereon is described as "half body image Gax".

In the specific example in FIG. 5(*c*), there is assumed a half body image Gax in a case where the cutting process has been performed on the animal image GA illustrated in FIG. 5(*b*). The half body image Gax is an image showing the left side of the body of the animal A. There is a case where, in the half body image Gax, a cross section generated due to the cutting process is described as "cross section Lx". As illustrated in FIG. 5(*c*), the cross section Lx is substantially parallel to an X-Z plane. Further, the whole of the spine curve S is included in the outer edge of the cross section Lx. The weight estimation device 100 performs a generating process after performing the cutting process. The whole image GW is generated by performing the generating process.

FIG. 5(*d*) is an explanatory diagram of the whole image GW generated by performing the generating process. In the specific example in FIG. 5(*d*), there is assumed a case where the whole image GW is generated from the half body image Gax illustrated in FIG. 5(*c*). That is, there is assumed a case where the whole image GW is generated from the half body image Gax showing the left side of the body of the animal A.

Meanwhile, there is a characteristic of animals such as swine that the left side and the right side of the body are symmetric. Therefore, it is estimated that an image that is symmetric to the half body image Gax showing a specified half body shows a half body on the opposite side of the specified half body. Accordingly, when the whole image GW is generated from the half body image Gax showing a specified half body of the animal A, the weight estimation device 100 generates an image symmetric to the half body image Gax (hereinafter, "half body image Gay"), as an image showing a half body on the opposite side of the specified half body. An image generated by combining the half body image Gax and the half body image Gay is stored as the whole image GW.

For example, the half body image Gax illustrated in FIG. 5(*c*) shows the left side of the body of the animal A. When the whole image GW is generated from the half body image Gax described above, the half body image Gay showing the right side of the body of the animal A is generated. The half body image Gay is symmetric to the half body image Gax with respect to a surface crossing the cross section Lx of the half body image Gax and in parallel to the X-Z plane. As illustrated in FIG. 5(*c*), the half body image Gay includes a cross section Ly. The cross section Ly of the half body image Gay is substantially overlapped with the cross section Lx of the half body image Gax. The half body image Gay is generated at a position where the cross section Ly substantially matches the cross section Lx of the half body image Gax.

FIG. 5(*d*) is a specific example of the whole image GW in a case where the left side of the body of the animal A is selected as a specified half body. As described above, when the animal image GA imaged from the left side of the body of the animal A is acquired, the left side of the body of the animal A is selected as a specified half body. On the other hand, in the present embodiment, when the animal image GA imaged from the right side of the body of the animal A is acquired, the right side of the body of the animal A may be selected as a specified half body.

In a case where the right side of the body of the animal A is selected as a specified half body, the half body image Gax showing the right side of the body of the animal A is generated. Further, in such a case, a half body image Gay showing the left side of the body is generated from the half body image Gax. That is, the half body image Gay showing the left side of the body is estimated from the half body image Gax showing the right side of the body of the animal A, and the whole image GW showing the whole body of the animal A is generated.

As is understood from the above descriptions, according to the present embodiment, in addition to a case where an animal is imaged from a first direction (for example, the left side of the body), even when the animal is imaged from a second direction (for example, the right side of the body) that is different from the first direction, the whole image GW is generated. As described above, the weight of the animal is estimated from the whole image GW. That is, according to the present embodiment, the weight of the animal can be estimated in both cases where the animal is imaged from the first direction and is imaged from the second direction. With this configuration, for example, as compared to a configuration in which the weight of an animal can be estimated only from images of the animal imaged from one specific direction, there is an advantage that the freedom degree of the imaging direction is improved.

Further, according to the straightening process of the present embodiment, a spine curve can be straightened as viewed from the Z-axis direction in either a case of acquiring images in which an animal in a posture (first posture) with which the spine curve is in a first shape is imaged or a case of acquiring images in which an animal in a posture (second posture) with which the spine curve is in a second shape is imaged. That is, the whole image GW (estimation information) is generated and the weight of the animal can be estimated regardless of the posture of the animal. Accordingly, for example, as compared to a configuration in which the weight of an animal can be estimated from images of the animal in the first posture but the weight of the animal cannot be estimated from images of the animal in the second posture, the present embodiment has an advantage that the freedom degree of postures enabling to estimate the weight of an animal is improved.

Figure 6:
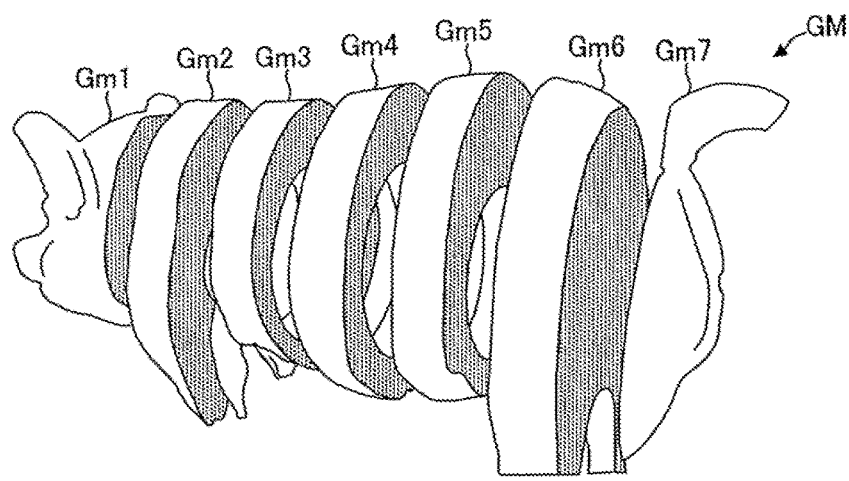
FIG. 6 are explanatory diagrams of a configuration to estimate a weight.
Figure 6:
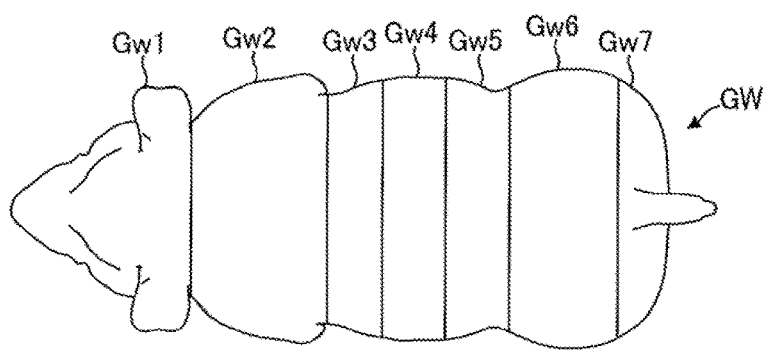
Figure 6:
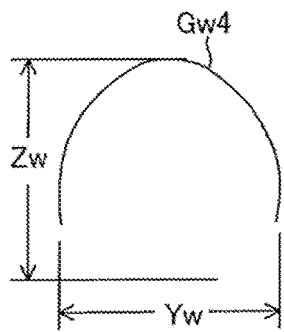
Figure 6:
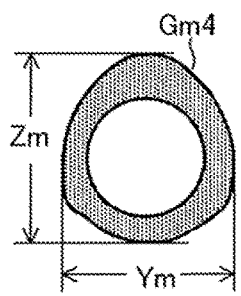
Figure 6:
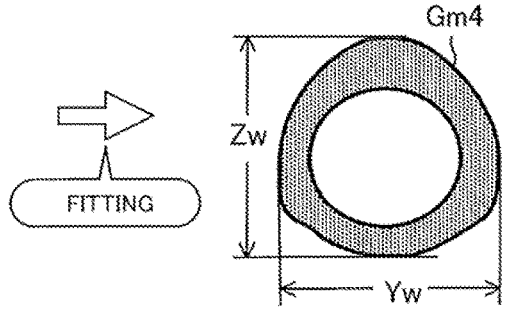
Figure 7:
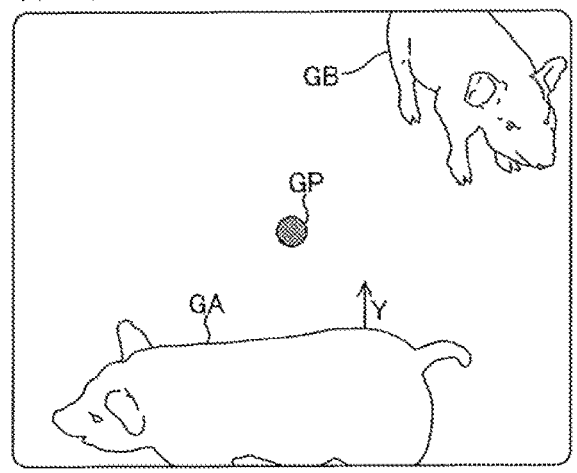
FIG. 7 are explanatory diagrams of a display displayed on a display unit.
Figure 7:
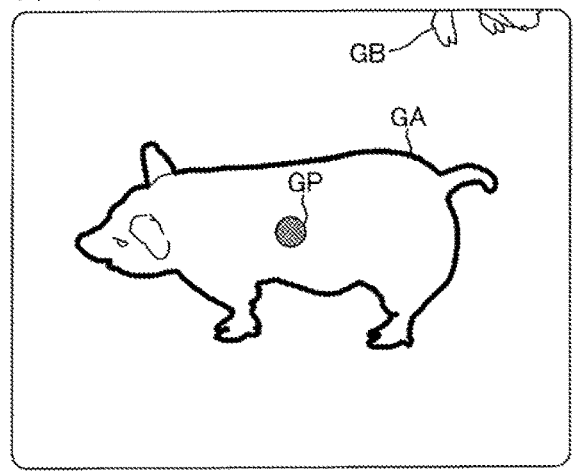
Figure 7:
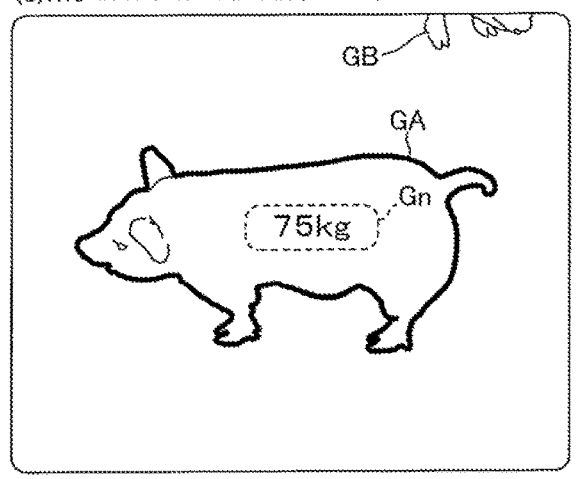

FIG. 6(*a*) to FIG. 6(*c*) and FIG. 6(*d*-1) to FIG. 6(*d*-3) are explanatory diagrams of specific examples of a configuration (the weight estimation unit 108) to calculate the weight of carcasses of the animal A. The weight estimation device 100 calculates (estimates) the weight of carcasses of the animal A by performing a weight estimating process.

FIG. 6(*a*) is a conceptual diagram of the carcass model image GM. As described above, the carcass model image GM is an image showing the whole body of the animal. Note that the carcass model image GM is an image of an animal from which portions (internal organs and the like) not regarded as carcasses are eliminated. Further, similarly to the whole image GW, the carcass model image GM is an image (a standardized image) of an animal with its spine curve being straight. As illustrated in FIG. 6(*a*), the carcass model image GM according to the present embodiment is constituted to include a model image Gm1 to a model image Gm7. Each of the model images Gm corresponds to any of the respective portions in the whole image GW.

FIG. 6(b) and FIG. 6(c) are explanatory diagrams of portions in the whole image GW corresponding to the model images Gm. In the present embodiment, as illustrated in FIG. 6(c), a portion in the whole image GW corresponding to the model image Gm1 is described as "portion image Gw1". Similarly, a portion in the whole image GW corresponding to the model image Gm2 is described as "portion image Gw2", a portion in the whole image GW corresponding to the model image Gm3 is described as "portion image Gw3", a portion in the whole image GW corresponding to the model image Gm4 is described as "portion image Gw4", a portion in the whole image GW corresponding to the model image Gm5 is described as "portion image Gw5", a portion in the whole image GW corresponding to the model image Gm6 is described as "portion image Gw6", and a portion in the whole image GW corresponding to the model image Gm7 is described as "portion image Gw7".

In the weight estimating process, the model images Gm are fitted (magnified or reduced) according to the portion image Gw corresponding to each of the corresponding model images Gm. Specifically, each of the corresponding model images Gm is fitted so that the outer edge of the portion image Gw matches the outer edge of the model image Gm. In the present embodiment, while the carcass model image GM is constituted of seven model images Gm, the carcass model image GM may be constituted of more than seven model images Gm and may be constituted of less than seven model images Gm.

FIG. 6(d-1) to FIG. 6(d-3) are explanatory diagrams of specific examples in a case where the carcass model image GM is fitted to the whole image GW. In these specific examples, a case where the model image Gm4 among the model images Gm is fitted is assumed.

As illustrated in FIG. 6(d-1), the portion image Gw4 is assumed to have Zw as its height in the Z-axis direction and Yw as its width in the Y-axis direction. As illustrated in FIG. 6(d-2), the model image Gm4 is assumed to have Zm as its height in the Z-axis direction and Ym as its width in the Y-axis direction. In this case, as illustrated in FIG. 6(d-3), the weight estimation device 100 magnifies (reduces in some cases) the model image Gm4 to have Zw as its height in the Z-axis direction and Yw as its width in the Y-axis direction. Specifically, the weight estimation device 100 performs pattern-matching on the cross section of the carcass model image GM using the shape of the portion image Gw4, thereby identifying (calculating) a vertical magnification "Zw/Zm" and a lateral magnification "Yw/Ym". Further, the weight estimation device 100 changes the height of the model image Gm4 according to the vertical magnification "Zw/Zm" and changes the width of the model image Gm4 according to "Yw/Ym".

After finishing the fitting on the carcass model image GM (all the model images Gm), the weight estimation device 100 calculates the volume of the carcass model image Gm. Further, the weight estimation device 100 estimates the product of the volume of the fitted carcass model image GM and the mean density of carcasses of the animal as the weight of carcasses of the animal. The weight estimation device 100 according to the present embodiment displays the estimated weight of carcasses on the display unit 102 (the head mounted display 20).

FIG. 7(a) and FIG. 7(b) are explanatory diagrams of various types of images displayed on the display unit 102. As described above, the display unit 102 according to the present embodiment is a head mounted display and a user can check an actual visibly recognized view and the display on the display unit 102 at a time.

FIG. 7(a) is a simulation diagram of a display M1 displayed before performing the weight estimating process. As described above, an image captured by the image capturing unit 101 is displayed on the display unit 102 on a real-time basis. Further, the imaging direction of the image capturing unit 101 substantially matches the line-of-sight direction of a user. The specific example in FIG. 7(a) assumes a case where the animal A is positioned below the center (hereinafter, "sight center") of the user's sight. In this case, as illustrated in FIG. 7(a), the animal image GA is displayed below the center of the display M1. Further, an animal B is positioned on the upper right of the user's sight center and an animal image GB is displayed on the upper right with respect to the center of the display M1.

As described above, in the present embodiment, when the weight of the animal A is estimated, the animal image GA is acquired in an excerpted manner from an image captured by the image capturing unit 101 (hereinafter, "view image"). Specifically, the animal image GA is identified from the view image with a region growing method and the animal image GA is acquired. Note that, when the animal image GA is identified with a region growing method as described above, it is necessary to identify pixels included in the animal image GA as seed pixels. In the following descriptions, an identification method of seed pixels is described in detail.

As illustrated in FIG. 7(a), the display M1 is constituted to include a point image GP. The point image GP is displayed on the display M1 in a fixed manner. That is, among the images displayed on the display M1, while the view image changes (moves) according to the imaging direction (the line-of-sight direction of the user), the position of the point image GP on the display M1 does not move according to the imaging direction.

In the configuration described above, pixels of the view image (including the animal image GA) having the point image GP positioned therein are identified as seed pixels. Therefore, for example, when the weight of the animal A is estimated, the imaging direction (the line-of-sight direction of the user) is changed so that the point image GP is positioned in the animal image GA. For example, in the specific example in FIG. 7(a), the line-of-sight direction of the user is moved (the line of sight of the user is moved lower) so that the animal image GA is moved in the direction of an arrow Y, thereby estimating the weight of the animal A.

FIG. 7(b) is a simulation diagram of a display M2 displayed when the weight estimating process is in progress. For example, the display M2 is displayed right after the animal image GA is identified with a region growing method. As illustrated in FIG. 7(b), similarly to the display M1, the display M2 is constituted to include a view image including the animal image GA and the point image GP.

When an animal image of an animal whose weight is to be estimated is identified, a configuration in which the animal image is displayed in a mode different from that of other animal images may be employed. For example, in the specific example in FIG. 7(b), there is employed a configuration in which the outer edge of the animal image GA of the animal A whose weight is to be estimated is displayed in a more highlighted (bolder faced) manner as compared to outer edges of other animal images. In this configuration, there is an advantage that a user can easily ascertain animal images to be used for estimating the weight of an animal.

In the present embodiment, the weight estimating process is performed according to an imaging operation of a user. Specifically, when an imaging operation is performed on the weight estimating device 100, at the time point of the imaging operation, an animal image positioned in the point image GP is acquired and the weight estimating process is performed. Note that a trigger to perform the weight estimating process may be set as appropriate. For example, it is possible to have a configuration in which the weight estimating process is performed automatically with movement of the point image GP onto the animal image GA regarded as a trigger.

FIG. 7(c) is a simulation diagram of a display M3 displayed right after ending the weight estimating process. As illustrated in FIG. 7(c), similarly to the display M1 and the display M2, the display M3 is constituted to include the animal image GA. Further, the display M3 is constituted to include a weight image Gn. The weight image Gn displays the weight of carcasses calculated in the weight estimating process described above. For example, in the specific example in FIG. 7(c), a case where "75 kg" is estimated as the weight of carcasses is assumed.

In the configuration described above, there is an advantage that a user can quickly ascertain the weight estimated by the weight estimating device 100. Further, as illustrated in FIG. 7(c), the weight image Gn is displayed as it is superimposed on the animal image (GA in the example in FIG. 7(c)) used for estimating the weight. In the configuration described above, for example, as compared to a configuration in which the weight image Gn is displayed at a position irrelevant to the position of the animal image, there is an advantage that the animal whose weight has been estimated (an animal image used for the weight estimating process) is easily ascertained. Note that the position in which the weight image Gn is displayed can be changed as appropriate.

As described above, in the present invention, it is possible to have a configuration in which the weight (live weight) of the whole body of an animal is estimated. In the configuration described above, a live weight is displayed on the weight image Gn. Further, in a case where a configuration in which both the live weight of an animal and the weight of carcasses are estimated is employed, it is preferable to have a configuration in which both the live weight and the weight of carcasses are displayed on the weight image Gn.

As illustrated in FIG. 7(c), the point image GP becomes non-displayed when the weight estimation process is ended. That is, when the weight image Gn is displayed, the point image GP becomes non-displayed. In this configuration, a disadvantage that the point image Gn and the weight image Gn are overlapped on each other and the weight image Gn is difficult to see due to the point image GP is avoided. Note that it is possible to have a configuration in which displaying of the point image GP is continued when the weight estimation process is ended.

Figure 8:
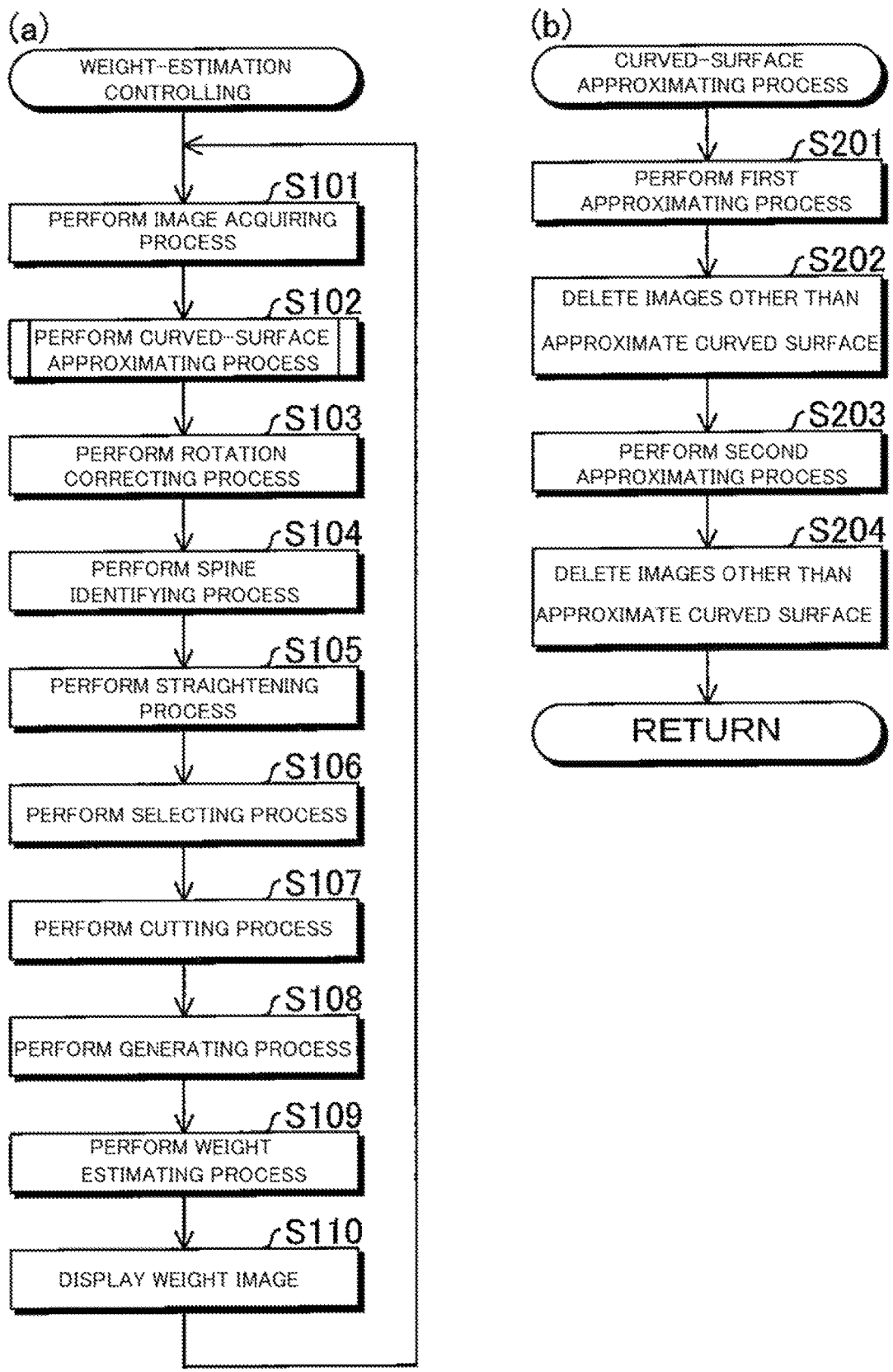
FIG. 8 are flowcharts of a weight-estimation controlling process.

FIG. 8(a) is a flowchart of a weight-estimation controlling process performed by the weight estimation device 100. For example, the weight estimation device 100 performs the weight-estimation controlling process with a predetermined time interval (an interruption period). Note that the trigger for performing the weight-estimation controlling process can be changed as appropriate.

When the weight-estimation controlling process is started, the weight estimation device 100 performs an image acquiring process (S101). In the image acquiring process, an animal image is acquired from a distance image (a view image including an animal image) captured according to an imaging operation. As a method for identifying an animal image from a distance image, for example, the region growing method described above is used. Further, in the image acquiring process, the animal image is converted into a real coordinate (an X-Y-Z coordinate).

After performing the image acquiring process, the weight estimation device 100 performs a curved-surface approximating process (S102). For example, the surface of animals such as swine is normally smooth. In consideration of such circumstances, in the curved-surface approximating process, the surface of the animal image acquired at Step S102 is approximated (fitted) to be a smooth curved surface. Details of the curved-surface approximating process are described below with reference to FIG. 8(b).

After performing the curved-surface approximating process, the weight estimation device 100 performs a rotation correcting process (S103). In the rotation correcting process, the orientation of the animal image in the Z-axis direction is adjusted (rotated) using the tilt information described above. Further, in the rotation correcting process, the orientation of the animal image on the X-Y plane (a horizontal plane) is adjusted using the principal component analysis described above.

After performing the rotation correcting process, the weight estimation device 100 performs a spine identifying process (S104). In the spine identifying process, a spine curve in the animal image is identified (see FIG. 4(a)). After performing the spine identifying process, the weight estimation device 100 performs a straightening process (S105). In the straightening process, the animal image is adjusted (transformed) so as to make the spine curve become straight as viewed from the Z-axis direction (see FIG. 5(b)).

After performing the straightening process, the weight estimation device 100 performs a selecting process (S106). In the selecting process, in a case where it is assumed that the animal image GA is cut into two images at the spine curve in the Z-axis direction, the half body shown in the larger one of the two images is selected as a specified half body.

After performing the selecting process, the weight estimation device 100 performs a cutting process (S107). In the cutting process, a portion representing the half body not selected as a specified half body is cut from the animal image (see FIG. 5(c)). After performing the cutting process, the weight estimation device 100 performs a generating process (S108). In the generating process, the whole image GW is generated from an animal image (a half body image) (see FIG. 5(d)).

After performing the generating process, the weight estimation device 100 performs a weight estimating process (S109). In the weight estimating process, the weight of carcasses of the animal is estimated (calculated) from the whole image GW generated in the generating process described above. Specifically, the carcass model image GM is fitted so as to match the outer edge of the whole image GW with the outer edge of the carcass model image GM (see FIG. 6(d-1) to FIG. 6(d-3)), and the volume of the fitted carcass model image GM is calculated. Further, the product of the mean density stored in advance and the volume of the carcass model image GM is calculated as the weight of carcasses.

After performing the weight estimating process, the weight estimation device 100 causes the display unit 102 to display the weight image Gn (see FIG. 7(c)) (S110). After displaying the weight image Gn, the weight estimation device 100 returns the process to Step S101.

FIG. 8(b) is a flowchart of the curved-surface approximating process (S102 in FIG. 8(a)). When the curved-surface approximating process is started, the weight estimation device 100 performs a first approximating process (S201). In the first approximating process, polynomial-approximation-function curved-surface fitting using the method of least squares is performed as each of points constituting the surface of an animal image (a point cloud image) is used as a sample point. The method of curved-surface approximation is not limited to polynomial-approximation-function curved-surface fitting and any appropriate method may be employed.

Meanwhile, when an animal whose weight is estimated is imaged, there is a case where another animal is in contact with the animal. In such a case, the animal image of the animal (an original imaging subject) whose weight is estimated may include an image showing another animal (hereinafter, "noise image"). If a noise image is included in the animal image used for weight estimation, a disadvantage that the weight is not estimated accurately may occur.

In consideration of such circumstances, after performing the first approximating process, the weight estimation device 100 deletes, as noise images, images not included in an approximate curved surface representing the surface of the animal as an imaging subject (S202). That is, a point cloud that is deviated from one approximate curved surface representing the surface of the animal as an imaging subject is deemed as a point cloud representing another animal or the like and it is deleted. In this configuration, the disadvantage described above is avoided.

After deleting noise images other than the approximate curved surface representing the surface of the animal as an imaging subject, the weight estimation device 100 performs a second approximating process (S203). In the second approximating process, similarly to the first approximating process, polynomial-approximation-function curved-surface fitting is performed on the animal image. Note that in the second approximating process, polynomial-approximation-function curved-surface fitting is performed using a polynomial in a higher degree as compared to the first approximating process.

In the second approximating process described above, the surface of the animal as an imaging subject is excerpted in a higher accuracy as compared to the first approximating process. Therefore, if noise images are not deleted completely at Step S202, the remaining noise images are excerpted in the second approximating process as images other than that of the surface of the animal as an imaging subject.

After performing the second approximating process, the weight estimation device 100 deletes noise images (S204). According to this configuration, for example, as compared to a configuration in which only the first approximating process out of the first approximating process and the second approximating process is performed, noise images are deleted from an animal image with higher accuracy. Therefore, there is an advantage that the weight of the animal as an imaging subject is estimated with high accuracy.

It is possible to have a configuration in which only the second approximating process out of the first approximating process and the second approximating process is performed (hereinafter, "comparative example Y"). Note that if the first and second approximating processes are performed on a common image, the processing load of the second approximating process tends to become larger than the processing load of the first approximating process. Further, noise images are deleted ultimately. Under such circumstances, it is true that noise images as a subject of performing the second approximating process are preferably as small as possible.

In the present embodiment, the first approximating process is performed before the second approximating process and noise images excerpted in the first approximating process are deleted. Therefore, there is an advantage that noise images as a subject of performing the second approximating process can be made smaller as compared to the comparative example Y.

Second Embodiment

When the weight of an animal (for example, a swine) is estimated, there is a case where it is required to take an image showing the whole back of the animal (see, for example, Patent Literature 1 mentioned above). In the first embodiment described above, there is an advantage that the weight of the animal can be estimated even from an image with a major portion (for example, a half) of the back of the animal missing.

In the first embodiment described above, when the weight of an animal is estimated, the shape of the portion of the animal missing in the animal image is estimated to generate the whole image GW. However, a possibility that there occurs an error between the estimated shape and an actual shape cannot be eliminated completely. That is, an error between the shape of the animal shown in the whole image GW and an actual shape of the animal may occur. Therefore, if an animal image showing the whole back of the animal is imaged, as compared to a case where the carcass model image GM is fitted on the basis of the whole image GW (an image showing an estimated shape of the animal), in a case where the carcass model image GM is fitted on the basis of the animal image (an image showing an actual shape of the animal), it is true that the weight of the animal tends to be estimated with higher accuracy.

In consideration of the above circumstances, when an animal image showing the whole back of an animal is imaged, the weight estimation device 100 according to a second embodiment performs fitting on the carcass model image GM on the basis of the animal image. In contrast, in other cases, the carcass model image GM is fitted on the basis of the whole image GW.

Specifically, upon acquisition of an animal image, the weight estimation device 100 according to the second embodiment determines whether an animal has been imaged from a vertical direction on the basis of the tilt information described above. Specifically, when the tilt information is within a predetermined range (0 degree±α), it is determined that the animal has been imaged from a vertical direction. On the other hand, when the tilt information is out of the range, it is determined that the animal has not been imaged from a vertical direction. When the animal has been imaged from a vertical direction, it is estimated that an image showing the whole back is included in the animal image.

When it is determined that the animal has been imaged from a vertical direction, the weight estimation device 100 performs fitting on the carcass model image GM on the basis of the animal image to estimate the weight of the animal. On the other hand, when it is determined that the animal has not been imaged from a vertical direction, the weight estimation device 100 generates the whole image GW from the animal image (similarly to the first embodiment). Further, the weight estimation device 100 performs fitting on the carcass model image GM on the basis of the whole image GW to estimate the weight of the animal.

In the second embodiment described above, similarly to the first embodiment, it is possible to estimate the weight of an animal. Further, when it is determined that the animal has been imaged from a vertical direction, the carcass model image GM is fitted on the basis of the animal image. Therefore, the effect that the weight of an animal can be estimated with high accuracy is remarkably significant. In the second embodiment, there is employed a configuration in which whether the carcass model image GM is fitted on the basis of an animal image or the carcass model image GM is fitted on the basis of the whole image GW is automatically selected. However, it is possible to have a configuration in which the shape of an animal image can be checked by a user before performing the weight estimating process and the manner of fitting can be selected by the user (manually) according to the shape of the animal image.

Summary of Actions and Effects of Aspect Examples in Present Embodiment

First Aspect

The weight estimation device (100) according to the present aspect includes the image acquisition unit (101) that acquires an image of an animal, the shape identification unit (104) that identifies a shape (a spinal curve) of a predetermined portion of the animal from the image, the information generation unit (106) that, on a basis of the shape of the predetermined portion, generates estimation information (the whole image GW) used for estimating a weight of the animal, and the weight estimation unit (108) that estimates the weight on a basis of the estimation information, wherein the information generation unit is capable of generating the estimation information in a case where a first image (the animal image GA) in which the animal is imaged from a first direction (for example, the left side of a body) is acquired and is capable of generating the estimation information also in a case where a second image in which the animal is imaged from a second direction (for example, the right side of the body) that is different from the first direction is acquired. According to the present aspect, the freedom degree of the imaging direction enabling to estimate the weight of the animal is improved.

Second Aspect and Third Aspect

In the weight estimation device (100) according to a second aspect, the predetermined portion of the animal is a spine of the animal, and the weight estimation device includes the half-body selection unit (105) that selects, as a specified half body, either one of a right side of a body and a left side of the body, respectively positioned on a right side and a left side from the spine as viewed from the animal, the information generation unit estimates a shape of a half body not selected as the specified half body from a shape of the specified half body (see FIG. 5(c)) and is capable of generating information indicating a shape of a whole body of the animal as the estimation information from the estimated shape of the half body and the shape of the specified half body (see FIG. 5(d)). According to the present aspect, effects identical to those of the first aspect described above are exerted. Further, the weight estimation device according to a third aspect includes an information storage unit that stores therein carcass model information (the carcass model image GM) indicating a shape of carcasses, and the weight estimation unit estimates a weight of carcasses of the animal on a basis of a shape of carcasses indicated by the carcass model information having been transformed according to a shape of the animal indicated by the estimation information (see FIG. 6(d-1) to FIG. 6(d-3)).

Fourth Aspect

In the weight estimation device (100) according to the present aspect, the information generation unit is capable of generating the estimation information in a case where a third image in which the animal in a first posture (a posture in which a spine curve is in a first shape) is imaged is acquired, and is capable of generating the estimation information also in a case where a fourth image in which the animal in a second posture (a posture in which the spine curve is in a second shape) that is different from the first posture is imaged is acquired. According to the present aspect, for example, as compared to a configuration in which the weight of the animal can be estimated from an image of the animal in the first posture but the weight of the animal cannot be estimated from an image of the animal in the second posture, there is an advantage that the freedom degree of postures enabling to estimate the weight of the animal is improved.

Fifth Aspect and Sixth Aspect

The weight estimation device (100) according to a fifth aspect includes the image capturing unit (101) that is fixable at a specific position as viewed from a user and is capable of capturing the animal positioned in a line-of-sight direction of the user, and the display unit (102) that is a head mounted display capable of displaying an image captured by the image capturing unit, wherein the image acquisition unit acquires an image captured by the image capturing unit. According to the present aspect, there is an advantage that, when an animal is imaged, it is not necessary to hold the image capturing unit in user's hand. Further, in the weight estimation device according to a sixth aspect, the image acquisition unit acquires a distance image including information indicating a distance to the animal.

Seventh Aspect

A program (the weight estimation program PG) according to the present aspect is a program causing a computer (10) to perform an image acquiring process of acquiring an image of an animal (S101 in FIG. 8(a)), a shape identifying process of identifying a shape of a predetermined portion of the animal from the image (S104 in FIG. 8(a)), an information generating process of, on a basis of the shape of the predetermined portion, generating estimation information used for estimating a weight of the animal (S108 in FIG. 8(a)), and a weight estimating process of estimating the weight on a basis of the estimation information (S109 in FIG. 8(a)), wherein in the information generating process, it is possible to generate the estimation information in a case where a first image in which the animal is imaged from a first direction is acquired and is possible to generate the estimation information also in a case where a second image in which the animal is imaged from a second direction that is different from the first direction is acquired. According to a seventh aspect, effects identical to those of the first aspect described above are exerted.

REFERENCE SIGNS LIST 100 weight estimation device, 101 image capturing unit, 102 display unit, 103 image acquisition unit, 104 shape identification unit, 105 half-body selection unit, 106 information generation unit, 107 carcass-model storage unit, 108 weight estimation unit.

The invention claimed is:

1. A weight estimation device comprising:
   an image acquisition unit that acquires an image of an animal;
   an information generation unit that is capable of generating estimation information indicating a shape of the animal from the image;
   an information storage unit that stores therein carcass model information indicating a shape of carcasses;
   a weight estimation unit that estimates a weight of carcasses of the animal on a basis of the estimation information, and the carcass model information,
   a shape identification unit that identifies a shape of a spine of the animal from the image of the animal; and
   a half-body selection unit that selects, as a specified half body, either one of a right side of a body and a left side of the body, respectively positioned on a right side and a left side from the spine as viewed from the animal, wherein
   the information generation unit is, even when an image in which the animal is imaged from an obliquely upward direction as viewed from the animal is acquired, capable of generating the estimation information indicating a shape of one portion of the animal from the image,
   the weight estimation unit estimates the weight of carcasses of the animal on a basis of a shape of carcasses indicated by the carcass model information having been transformed according to a shape of one portion of the animal indicated by the estimation information, and
   the information generation unit estimates a shape of a half body not selected as the specified half body from a shape of the specified half body and is, upon acquisition of the image, capable of automatically generating information indicating a shape of the animal generated by combining the estimated shape of the half body and the shape of the specified half body as the estimation information.

2. The weight estimation device according to claim 1, wherein the information generation unit is capable of generating the estimation information from which a weight is estimated, the weight being substantially common to a case where an image in which the animal is imaged from an obliquely upward direction of a left side of a body as viewed from the animal is acquired and a case where an image in which the animal is imaged from an obliquely upper direction of a right side of the body as viewed from the animal is acquired.

3. The weight estimation device according to claim 1, comprising a posture adjustment unit that is capable of adjusting, when an image of the animal in a posture with a spine thereof being curved is acquired, the posture of the animal shown in the image to be posture with the spine being straight, wherein the information generation unit is capable of generating the estimation information from the image having been adjusted by the posture adjustment unit.

4. The weight estimation device according to claim 1, comprising:
   an image capturing unit that is fixable at a specific position as viewed from a user and is capable of capturing the animal positioned in a line-of-sight direction of the user; and
   a display unit that is a head mounted display capable of displaying an image captured by the image capturing unit, wherein the image acquisition unit acquires an image captured by the image capturing unit.

5. The weight estimation device according to claim 1, wherein the image acquisition unit acquires a distance image including information indicating a distance to the animal.

6. A non-transitory storage medium for storing a program for causing a computer to function as the weight estimation device according to claim 1.

* * * * *